United States Patent
Beile et al.

(10) Patent No.: US 9,945,002 B2
(45) Date of Patent: Apr. 17, 2018

(54) PREHEATING APPARTUS FOR STEEL SCRAP AND METALLURGICAL MELTING VESSEL EQUIPPED THEREWITH

(75) Inventors: Hannes Beile, Ettenheim (DE);
Markus Dorndorf, Baden-Baden (DE);
Hansjörg Huber, Kehl (DE);
Christiane Kiessner, Kehl (DE); Petra Kreuder, Waldkirch (DE); Matthias Krieg, Ohlsbach (DE); Alexander Mëller, Offenburg (DE); Robert Schalast, Willstätt-Legelshurst (DE);
Michael Schmid, Biberach/Baden (DE)

(73) Assignee: PRIMETALS TECHNOLOGIES AUSTRIA GMBH, Linz (AT)

( * ) Notice: Subject to any disclaimer, the term of this patent is extended or adjusted under 35 U.S.C. 154(b) by 698 days.

(21) Appl. No.: 13/825,768

(22) PCT Filed: Sep. 15, 2011

(86) PCT No.: PCT/EP2011/066018
§ 371 (c)(1),
(2), (4) Date: Jun. 24, 2013

(87) PCT Pub. No.: WO2012/038320
PCT Pub. Date: Mar. 29, 2012

(65) Prior Publication Data
US 2013/0259082 A1    Oct. 3, 2013

(30) Foreign Application Priority Data

Sep. 22, 2010 (DE) .................. 10 2010 041 209

(51) Int. Cl.
*F27D 13/00* (2006.01)
*F27D 3/00* (2006.01)
(Continued)

(52) U.S. Cl.
CPC .............. *C21C 5/565* (2013.01); *F27B 3/186* (2013.01); *F27D 3/0032* (2013.01);
(Continued)

(58) Field of Classification Search
None
See application file for complete search history.

(56) References Cited

U.S. PATENT DOCUMENTS 3,180,724 A * 4/1965 Brooke ................. F27D 13/002
266/901
4,249,721 A * 2/1981 Udo .......................... C21C 5/38
266/156
(Continued)

FOREIGN PATENT DOCUMENTS

CN        1224064 A      7/1999
DE      37 13 369 A1    11/1988
(Continued)

OTHER PUBLICATIONS

Notice of Allowance dated Jun. 22, 2015 in corresponding Russian Patent Application No. 2013118339/02(027113) with German Translation.
(Continued)

*Primary Examiner* — David Angwin
*Assistant Examiner* — Gyounghyun Bae
(74) *Attorney, Agent, or Firm* — Staas & Halsey LLP

(57) ABSTRACT

A metallurgical melting vessel has a vertical shaft, surrounded by a housing wall, which receives steel scrap. At least one closure element, having laterally spaced-apart fingers extending parallel to one another, is mounted such that it can move between a closed position and an open position. In the closed position, the fingers protrude at least partially into the shaft for the purpose of holding back steel scrap. In the open position, the fingers free the shaft at least
(Continued)

to such an extent that the steel scrap can fall from the shaft into the melting vessel. The at least one closure element is mounted so as to be movable from the side of the shaft into the shaft and laterally thereoutof.

17 Claims, 5 Drawing Sheets

(51) Int. Cl.
*C21C 5/56* (2006.01)
*F27B 3/18* (2006.01)
*C21C 5/52* (2006.01)

(52) U.S. Cl.
CPC ......... *F27D 3/0033* (2013.01); *F27D 13/002* (2013.01); *C21C 2005/5282* (2013.01); *Y02P 10/216* (2015.11)

(56) References Cited

U.S. PATENT DOCUMENTS

| | | | | |
|---|---|---|---|---|
| 4,653,730 A | * | 3/1987 | Wunsche | C21C 5/5217 266/225 |
| 4,696,013 A | * | 9/1987 | Ehle | F27B 3/065 373/71 |
| 4,852,858 A | * | 8/1989 | Weber | C21B 13/023 266/175 |
| 5,009,865 A | * | 4/1991 | Boden | C30B 13/32 117/15 |
| 5,073,183 A | * | 12/1991 | Hammond | C03B 3/00 414/166 |
| 5,264,020 A | * | 11/1993 | Ehle | C21C 5/5252 266/142 |
| 5,390,212 A | * | 2/1995 | Bonnet | C21C 5/5211 222/503 |
| 5,533,043 A | * | 7/1996 | Forestier | C21C 5/565 373/81 |
| 5,645,791 A | | 7/1997 | Fuchs et al. | |
| 5,647,288 A | | 7/1997 | Matsumoto et al. | |
| 6,024,912 A | * | 2/2000 | Wunsche | C21C 5/565 266/156 |
| 6,201,826 B1 | * | 3/2001 | Giannoulidis | C21C 5/565 373/78 |
| 6,335,945 B1 | * | 1/2002 | Meierling | C21B 13/026 373/79 |
| 6,544,470 B1 | * | 4/2003 | Schmale | C21C 5/527 266/197 |
| 7,374,716 B2 | | 5/2008 | Fuchs | |
| 2003/0009846 A1 | * | 1/2003 | Durand | B60J 5/06 16/87 R |
| 2003/0024138 A1 | * | 2/2003 | Frigon | E02F 3/404 37/406 |
| 2003/0075843 A1 | * | 4/2003 | Wunsche | C21C 5/4606 266/225 |
| 2003/0122290 A1 | * | 7/2003 | Wunsche | C21B 11/08 266/200 |
| 2004/0239014 A1 | | 12/2004 | Fuchs | |
| 2007/0113337 A1 | * | 5/2007 | Hug | A45F 3/24 5/120 |
| 2009/0274190 A1 | * | 11/2009 | Fuchs | F27B 3/085 373/71 |
| 2009/0322108 A1 | * | 12/2009 | Bina | A47J 43/28 294/99.2 |
| 2010/0176563 A1 | * | 7/2010 | Madler | A01D 34/66 280/5.507 |

FOREIGN PATENT DOCUMENTS

| | | |
|---|---|---|
| DE | 101 40 805 A1 | 3/2003 |
| EP | 0 291 701 | 11/1988 |
| EP | 0 711 397 | 2/1995 |
| RU | 2 044 977 C1 | 9/1995 |
| RU | 2 293 938 C1 | 2/2007 |
| RU | 2 295 683 C2 | 3/2007 |
| WO | 98/07889 | 2/1998 |
| WO | 99/28513 | 6/1999 |
| WO | 03/019096 A1 | 3/2003 |

OTHER PUBLICATIONS 102010041209.0, filing date Sep. 22, 2010, Hannes Beile et al., Siemens Aktiengesellschaft.
International Search Report for PCT/EP2011/066018; dated Dec. 27, 2011.
Office Action dated Feb. 20, 2014 in corresponding Chinese Application No. 201180045455.X.

* cited by examiner

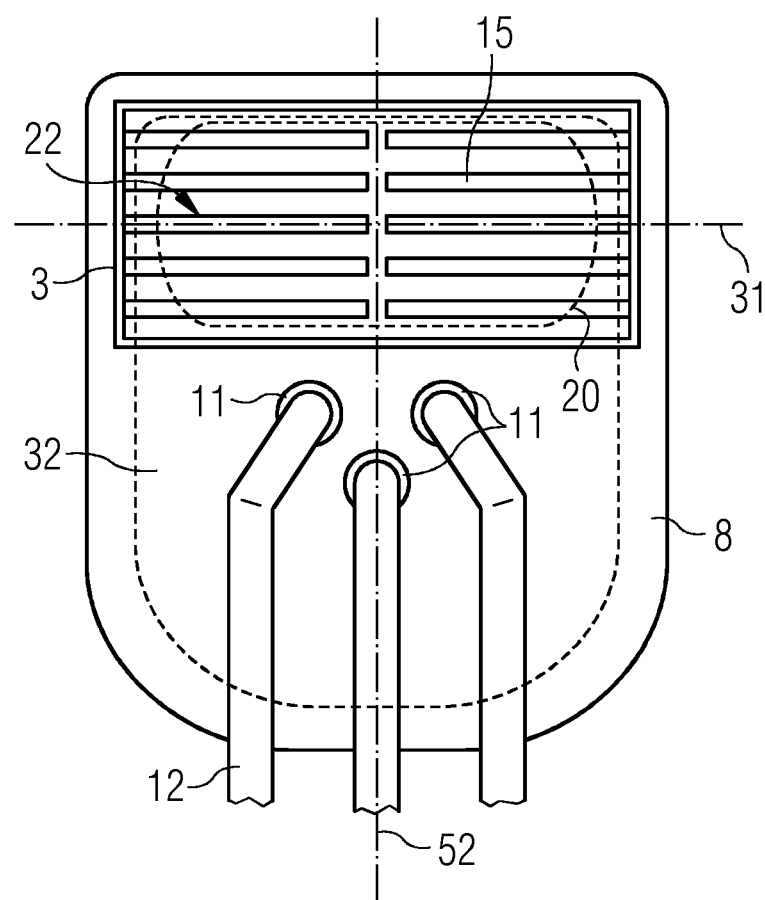

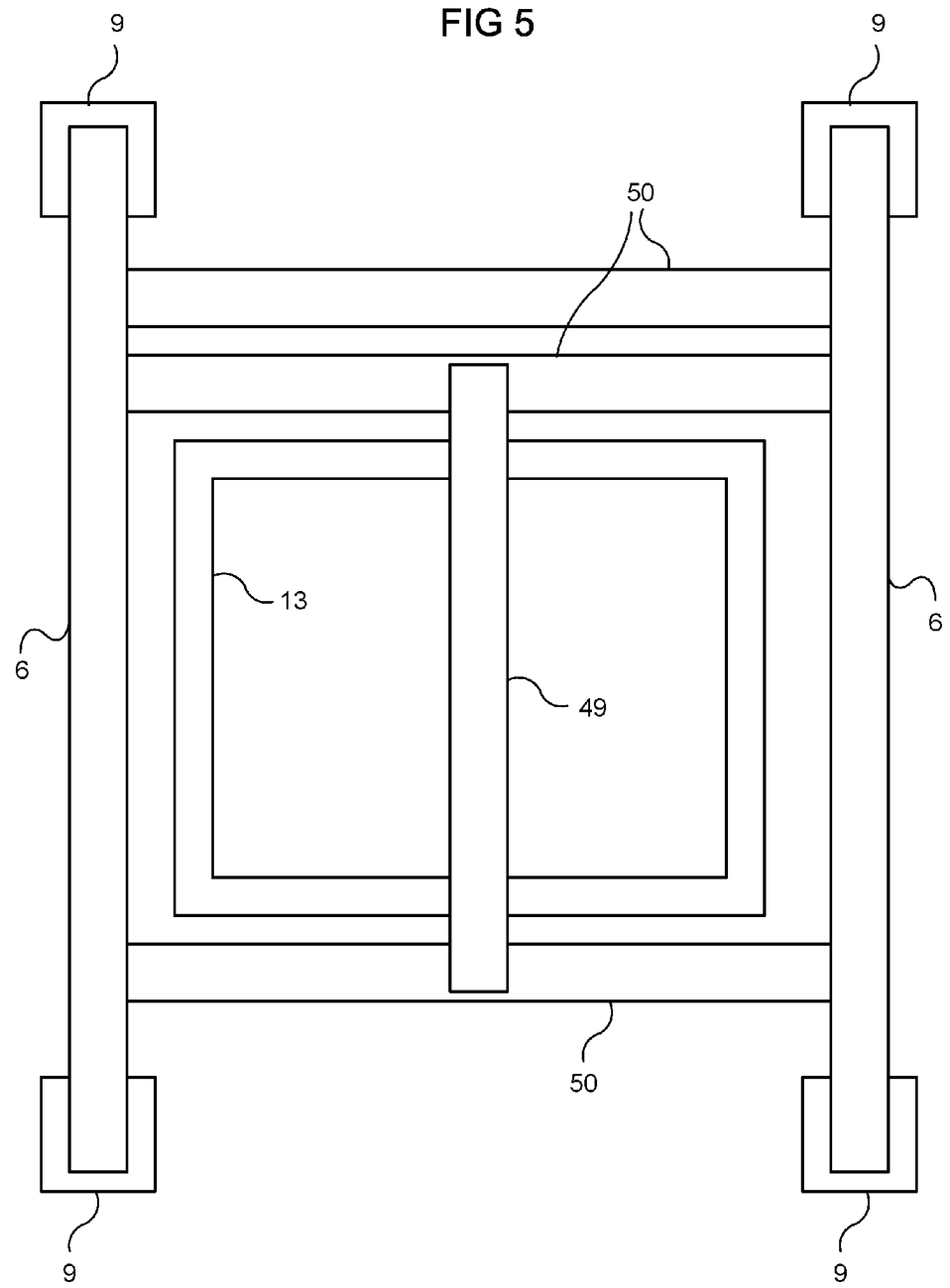

PREHEATING APPARTUS FOR STEEL SCRAP AND METALLURGICAL MELTING VESSEL EQUIPPED THEREWITH

CROSS REFERENCE TO RELATED APPLICATIONS

This application is the U.S. national stage of International Application No. PCT/EP2011/066018, filed Sep. 15, 2011 and claims the benefit thereof. The International Application claims the benefits of German Application No. 102010041209.0 filed on Sep. 22, 2010, both applications are incorporated by reference herein in their entirety.

BACKGROUND

Described below is a preheating apparatus for steel scrap and to metallurgical melting vessel equipped therewith. A preheating apparatus known for example from EP 0 711 397 A1 has a vertical shaft surrounded by a housing wall used to receive the steel scrap and at least one closure element which has a plurality of laterally spaced-apart fingers extending parallel to one another. The closure element is mounted such that it can move between a closed position and an open position. In the closed position the fingers extend at least partly into the shaft for the purposes of holding back steel scrap. Hot gases formed during the melting process flow between the fingers and heat up the steel scrap present in the shaft. In the open position the fingers open up the shaft at least far enough to enable the steel scrap to fall out of the shaft and into a melting container positioned below the shaft.

In the known preheating apparatuses two closure elements are provided, wherein these are each supported pivotably around a pivot axis extending into an edge area of the shaft like a type of two-armed lever. Starting from their closed position in which they protrude into the shaft and hold back steel scrap in the shaft, they are moved into their open position by being pivoted downwards. The steel scrap can then reach the melting container and a steel melt present therein via a container opening. For reasons of process economy the amounts of steel scrap charged in each case are so large that initially a column of steel scrap is formed, which possibly might extend upwards into the pivot area of the closure elements. Until the closure elements can be closed again in this case there must therefore be a period which is long enough for the height of the steel scrap column to be reduced by the melting of the steel scrap at the base of the column to enable the closure elements to be pivoted upwards again into their closed position and to enable a new charge of steel scrap to be introduced into the preheating apparatus for preheating.

SUMMARY

Described below is a preheating apparatus and a metallurgical melting vessel equipped therewith which make shorter process times possible. This is achieved in a preheating apparatus by at least one closure element being mounted so that it is able to be moved from the side of the shaft into the shaft and sideways out of the shaft. By contrast with the known preheating apparatus, in which, in its open position, the closure element is disposed completely within the shaft, there is the possibility with the embodiment of taking the closure element in the open position entirely out of the shaft and/or of disposing its movement path upwards as far as possible so that the danger of a blockage of the closure element by a column forming during the charging of steel scrap in the melting vessel is reduced.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 4 is a greatly schematicized overhead view of the melting vessel of FIG. 2, and FIG. 5 is a simplified cross-section at line V-V in FIG. 2.

DETAILED DESCRIPTION OF THE PREFERRED EMBODIMENT

Figure 1:
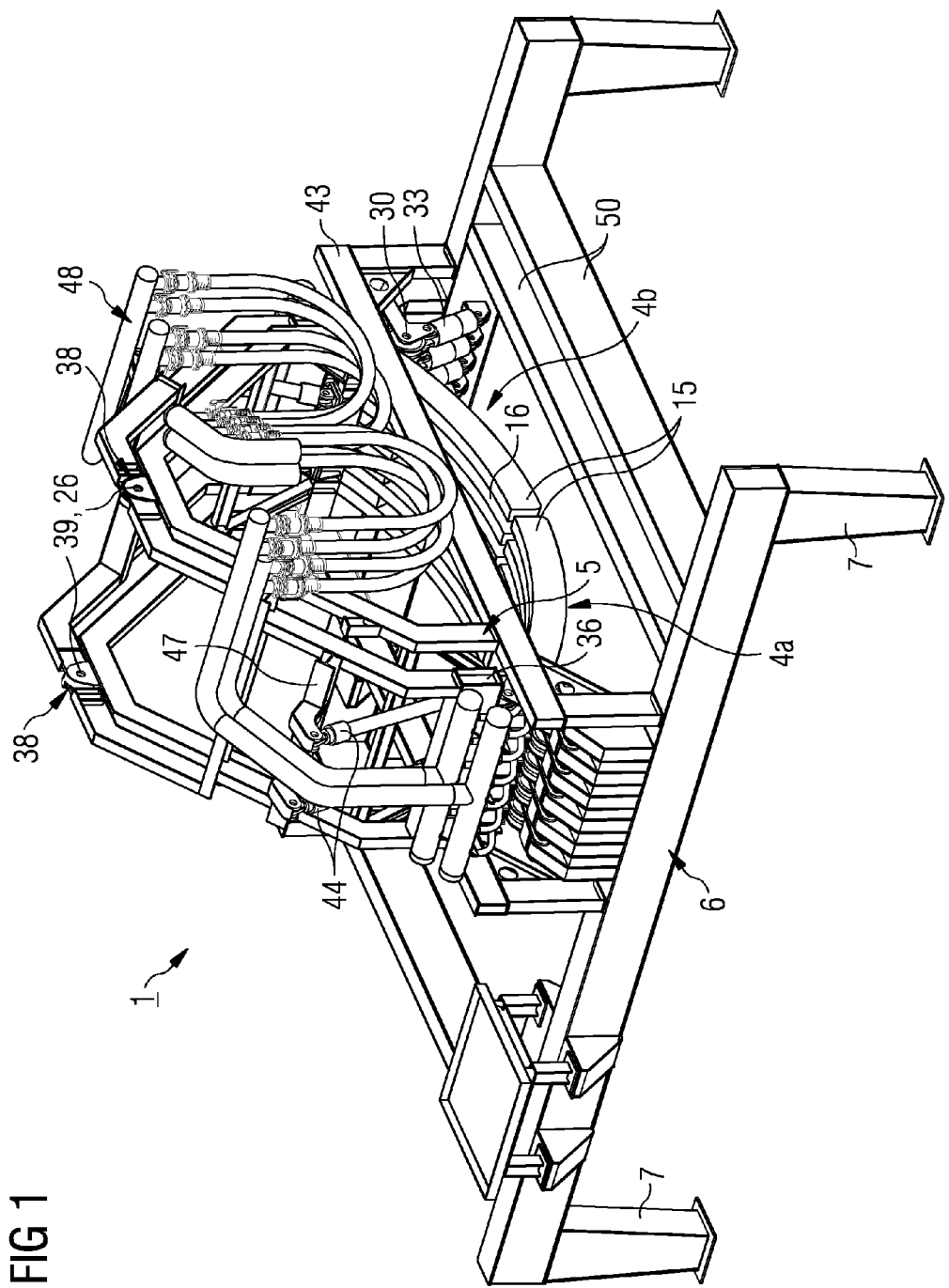
FIG. 1 is a perspective view of a preheating apparatus, wherein however, for reasons of clarity, a shaft surrounded by a housing wall serving to accommodate steel scrap is not shown.

Reference will now be made in detail to the preferred embodiments, examples of which are illustrated in the accompanying drawings, wherein like reference numerals refer to like elements throughout.

The preheating apparatus 1 has a shaft 3 delimited by a housing wall 2 (not shown in FIG. 1), two closure elements 4a, 4b, a support frame 5, on which the closure elements 4a, 4b are movably supported, and also a base frame 6, on which the support frame 5 is disposed on its upper side. Attached to the lower side of the base frame 6 are four support posts 7. If a metallurgical melting vessel 8 is equipped with a preheating apparatus 1, this will be disposed above the melting vessel 8, wherein the support posts 7 surround the melting vessel 8 to the sides and for example rest on a foundation 9. The melting vessel 8 is embodied in the usual way. On its inner side is an area for accepting steel melt 10 with a fire-proof lining 13. It has a charging opening 14, above which the shaft 3 of the preheating apparatus 1 is disposed. Melting electrodes 11, which are provided with electrical supply leads 12, project into the melting vessel 8.

The closure elements 4a, 4b, as major parts effecting the closing off of the shaft 3, include fingers 15 typically embodied in the shape of bars or rods. The fingers 15, as can be seen from FIG. 1, are spaced apart transversely to their longitudinal extent, so that a space 16 is present between them through which hot gases penetrate upwards from the melting vessel 8 into the shaft 3 and can heat up scrap or steel scrap (not shown) present there.

Figure 2:
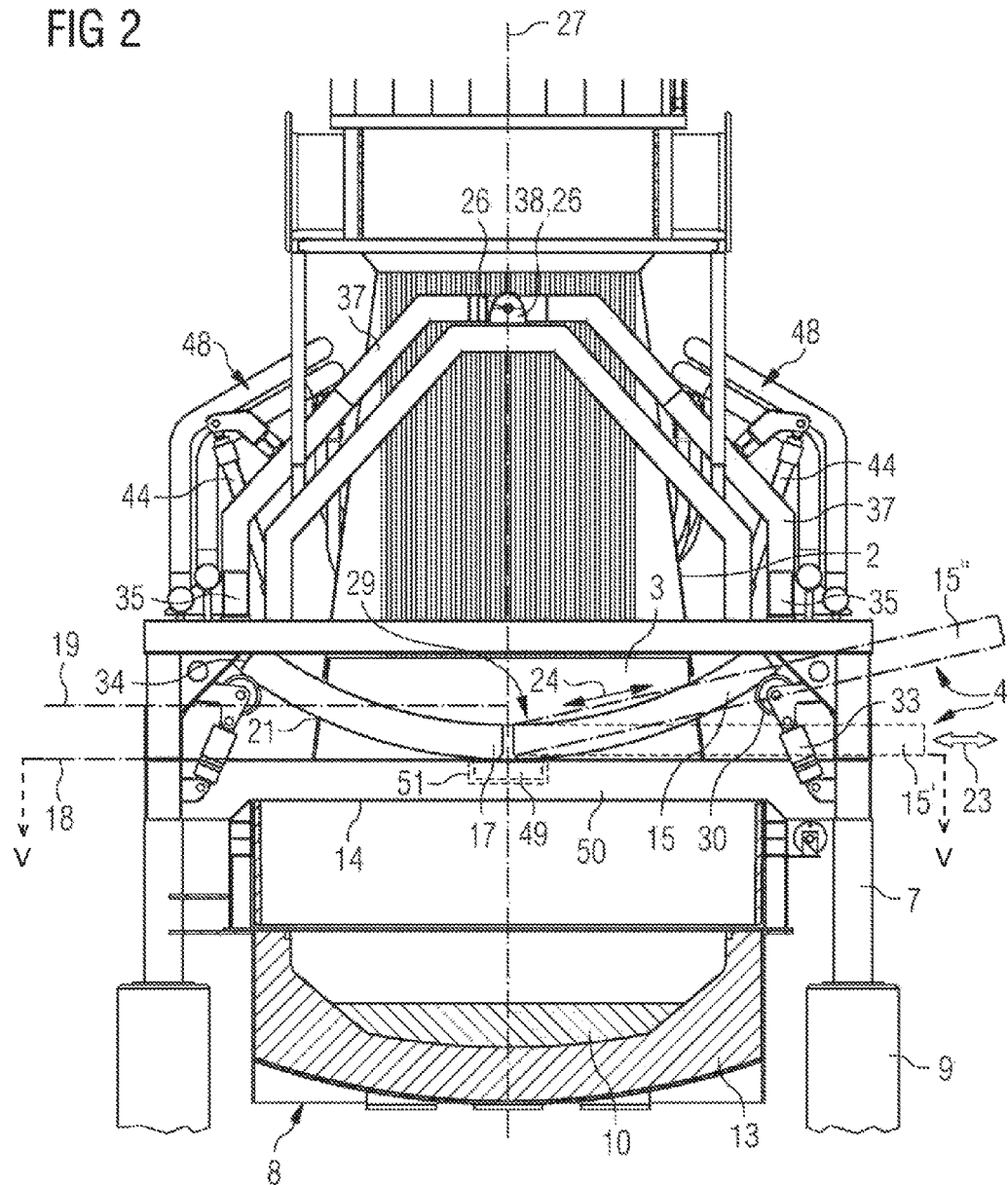
FIG. 2 is a side view of a metallurgical melting vessel with a preheating apparatus positioned above it, of which the closure elements are in the closed position.
Figure 3:
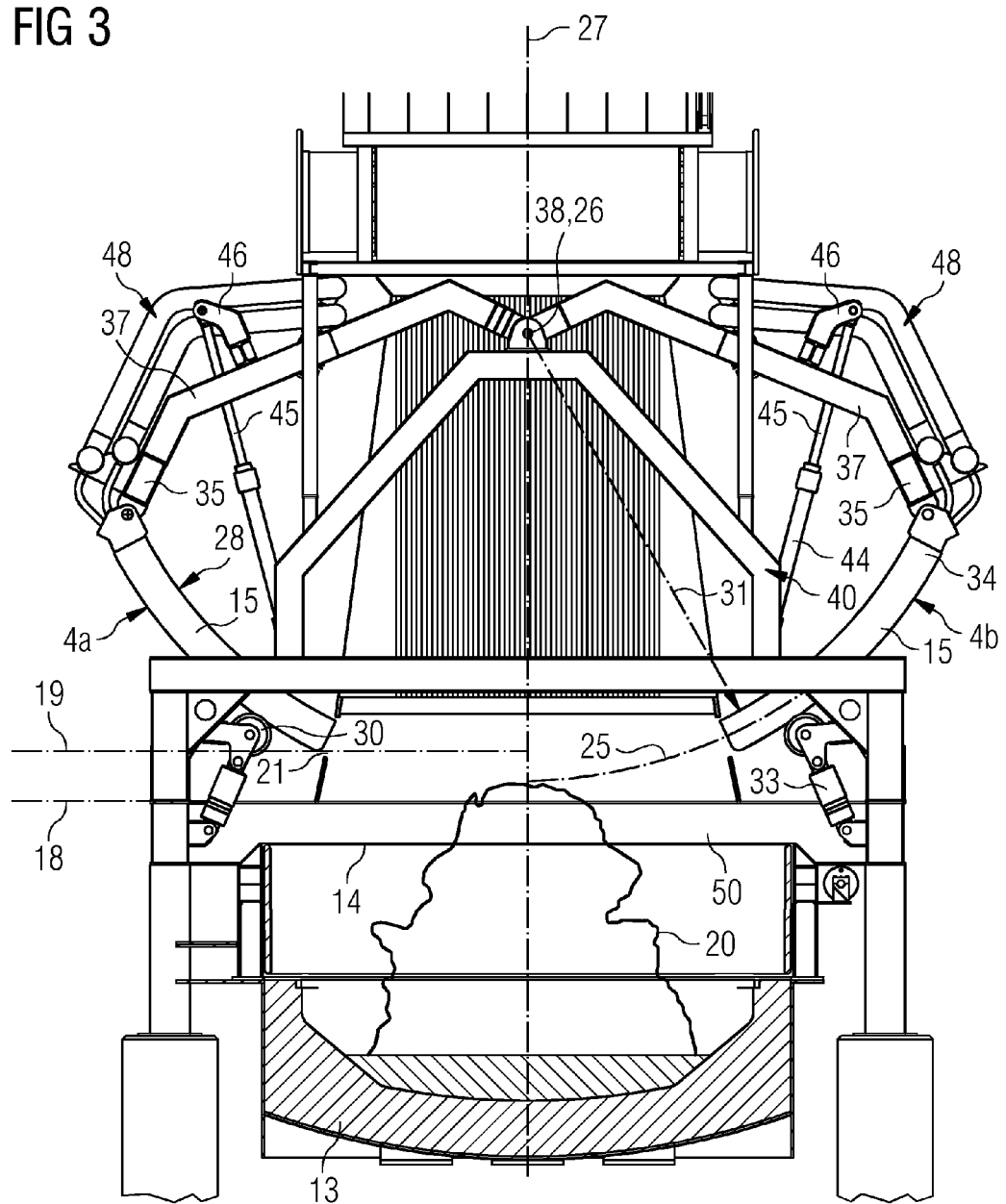
FIG. 3 is a side view of the metallurgical melting vessel illustrated in FIG. 2, in which the closure elements of the preheating apparatus are in their open position.

As can be seen from FIGS. 2 and 3, the closure elements 4a, 4b are able to be moved between a closed position (FIG. 2) and an open position (FIG. 3) and during this movement are able to be moved sideways into the shaft 3 or sideways out of the shaft. In their open position they may not project at all or to a significant extent into the shaft 3 in this case, so that the steel scrap can fall down without hindrance from the shaft 3 and reach the melting vessel 8. A plurality of options is available for the embodiment and mounting of the closure elements 4a, 4b or also of an individual closure element. In all cases it is expedient to have an embodiment in which a closure element 4a, 4b is supported and disposed so that, in the closed position, the free ends 17 of the fingers 15 projecting into the shaft 3 are located at a height level 18 which is the same or lower than the height level 19 assumed by them in the open position. In this way it is guaranteed that the movement path of a closure element 4, 4a, 4b is located at a height level which is not generally reached by a column of scrap or steel scrap forming during charging.

A closure element 4 can for example have fingers 15' in the form of rods or bars, extending in a straight line, which are able to be moved in the horizontal direction 23 between the closed and the open position. It is also conceivable for a closure element 4 to be supported and aligned so that its finger 15" has a movement path running obliquely in the direction 24, enclosing an angle opening upwards with a vertical axis of the shaft (3) (see FIG. 2).

The closure elements 4a, 4b may be mounted so that their fingers 15 move on a circular path 25. In this case it is advantageous for the axis of rotation 26 for the circular movement to be disposed at a vertical distance above the fingers 15 and to run obliquely to a vertical axis 27 of the shaft 3. On the one hand there is more room available as a rule above the closure elements 4a, 4b for arranging a drive for the closure elements 4a, 4b. In addition this produces an opening characteristic of the closure elements 4a, 4b similar to that of an excavator shovel. In particular when two closure elements 4a, 4b are present, as in the exemplary embodiment shown, with a symmetrical movement of the closure elements 4a, 4b the scrap or steel scrap is released centrally from the shaft 3, so that it falls in an essentially vertical direction into an eccentric area 22 of the melting vessel 8 present below the shaft 3 (FIG. 4). In this way the scrap or steel scrap is prevented from sliding towards the melting electrodes 11 and damaging these electrodes.

It is advantageous for the closure elements 4, 4a, 4b to be arranged so that the movement path of the fingers 15, 15', 15" of the closure elements 4, 4a, 4b runs in a vertical plane 31, which extends transverse to a vertical plane 52 intersecting with both the area 22 and also with the container area 32 having the melting electrodes 11.

As an alternative it is equally possible for at least one, especially precisely one closure element, to be disposed so that the movement path of the fingers of the closure element runs perpendicular to the vertical plane 31 and thus extends in parallel to the vertical plane 52.

Basically a closure element can be disposed to allow movement into the shaft 3 from each side and sideways movement out of the shaft. The arrangement of a single closure element on a side of the shaft 3 lying opposite one of the melting electrodes 11 has been proven to be just as effective as the arrangement of two closure elements in accordance with FIG. 4.

The shaft 3, viewed from above, is frequently embodied as a rectangle, wherein a long side of the rectangle mostly faces towards the melting electrodes 11. This enables the fingers 15 of one closure element which is disposed on the long side of the rectangle to be mostly able to be dimensioned shorter than with of a closure element which is disposed on one of the short sides of the rectangle. The shortened design gives advantages in respect of the mechanical stability of the fingers.

To prevent the scrap or steel scrap sliding sideways in the area 22 of the melting container 8, it is especially advantageous for the fingers 15 to be curved with a concave side 28 pointing upwards in a circular shape, wherein the axis of rotation 26 forms the central point of the curvature. If the fingers are to be guided through the housing wall 2 of the shaft 3, then as a result of this design only one opening 21 is necessary therein, the shape and size of which essentially corresponds to the cross-sectional shape of a finger 15.

The two closure elements 4a, 4b lie opposite one another, wherein in the closed position they each close off one half of the shaft 3. Because of the circular-shaped curvature of the closure elements 4a, 4b, in the closed position a trough-shaped depression 29, is formed, the lowest point of which runs centrally in the shaft 3. When the closure elements 4a, 4b are opened, the steel scrap is guided thereby into a central area of the melting vessel 8.

Guide rollers 30 are disposed outside the shaft 3 on the support frame 5 which are pressed with the aid of a spring element 33, against the underside of the fingers 15. In this way the fingers 15 are guided and supported.

The fingers 15 are fixed with their outer ends 34 to a strip-shaped traverse 35 running in the direction of the axis of rotation 26. A one-armed lever arm 37 is connected to the ends 36 of the traverse 35 with its one end 41. The other ends 42 of two opposing lever arms 37 are held pivotably on a common bearing 38, wherein this contains the axis of rotation 26, for example in the form of a bearing pin 39. The bearings 38 are attached in the apex area of a bow-shaped frame 40, which rests on a support 43 of the support frame 5 running transverse to the axis of rotation 26.

When the lever arms 37 are raised and lowered, the fingers 15 are moved between their closed and open position. For this purpose two fluid cylinders 44, which are spaced apart from one another in the direction of the axis of rotation 26, are assigned to each closure element 4a, 4b. The fluid cylinders 44 rest with their lower end on the support frame 5 and are connected in an articulated manner by the free ends of their piston rods 45 to a pivot bearing 46. The pivot bearings 46 for their part are present on a traverse 47 (FIG. 1), which connects the two lever arms 37 assigned to a closure element 4a, 4b to one another. In the closed position of the closure elements 4a, 4b the piston rods 45 are retracted (FIG. 2). By moving the piston rods 45 out the lever arms 37 are raised and the closure elements 4a, 4b or the fingers 15 are moved on a circular path into their open position.

The fingers 15 are hollow internally and have coolant flowing through them during operation. In order to guarantee this a system of lines 48 for delivering and taking away coolant is fixed to the lever arms 37 or to the traverses 35.

In order to relieve the load on the fingers 15 in the closed position of the tons of steel scrap present in the shaft 3 a support bearing 49 is present on which the free ends 17 of the fingers 15 rest with their lower side in the closed position. The support bearing 49 is for example embodied in the form of a rod or bar and may be able to be moved by a translational movement sideways into the shaft 3 or out of this shaft. The support bearing 49 is supported for its part on the base frame 6, for example on the horizontal bars 50 running transverse to the axis of rotation 26 as illustrated in FIG. 5, and is for example guided in a recess 51 embodied for the cross-sectional shape of the support bearing 49 in the horizontal bars 50.

The exemplary embodiments shown in the figures are merely a few of the possible forms of embodiment of the preheating apparatus which can be readily deduced by the person skilled in the art in the light of the description. It will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A preheating apparatus for steel scrap which is to be charged into a metallurgical melting vessel, comprising:
   a vertical shaft, disposed above a metallurgical melting vessel and surrounded by a housing wall, receiving the steel scrap;

at least one closure element having fingers laterally spaced substantially equidistantly apart, each finger being curved along an arc of curvature and having a concave upper surface; and a support structure including a base frame with an opening above the metallurgical melting vessel and a support frame, having lower ends attached to the base frame and upper ends attached to the at least one closure element and suspending the at least one closure element above the opening in the base frame, the at least one closure element being supported during movement from a closed position in which the at least one closure element holds back the steel scrap by protruding at least partly into the vertical shaft, to an open position in which the at least one closure element is opened at least wide enough so that the steel scrap falls from the vertical shaft through the opening in the base frame and into the metallurgical melting vessel, the movement of the at least one closure element being along the arc of curvature and having an axis of rotation located at a vertical distance above the fingers and running transverse to a vertical axis of the vertical shaft, the axis of rotation being located at a center of the arc of curvature of the fingers.

2. The preheating apparatus as claimed in claim 1, wherein when the at least one closure element is in the closed position, a free end of the fingers projecting into the shaft is not higher above the metallurgical melting vessel than when the at least one closure element is in the open position.

3. The preheating apparatus as claimed in claim 2, wherein the at least one closure element performs a translational movement between the closed and the open position thereof.

4. The preheating apparatus as claimed in claim 3, wherein the at least one closure element includes two diametrically-opposed closure elements, each obstructing one half of the vertical shaft in the closed position.

5. The preheating apparatus as claimed in claim 4, wherein the two diametrically-opposed closure elements both pivot around the axis of rotation.

6. The preheating apparatus as claimed in claim 5, wherein the concave upper surface of the fingers form a trough-shaped recess in the closed position, having lowest points along a line substantially intersecting the vertical axis of the vertical shaft.

7. The preheating apparatus as claimed in claim 6, wherein the support structure includes at least one support bearing protruding, in the closed position of the at least one closure element, into the vertical shaft and supporting the at least one closure element on an underside thereof.

8. The preheating apparatus as claimed in claim 7, wherein the support structure further includes at least one support bracket supporting the at least one support bearing during movement translationally into and out of the vertical shaft.

9. The preheating apparatus as claimed in claim 1, wherein the at least one closure element includes two diametrically-opposed closure elements, each obstructing one half of the vertical shaft in the closed position.

10. A metallurgical melting apparatus, comprising:
a metallurgical melting vessel with a charging opening on an upper side for receiving steel scrap; and a preheating apparatus disposed above the charging opening, including
a vertical shaft, disposed above the metallurgical melting vessel and surrounded by a housing wall, receiving the steel scrap;
at least one closure element having fingers laterally spaced substantially equidistantly apart, each finger being curved along an arc of curvature and having a concave upper surface; and
a support structure including a base frame with an opening above the metallurgical melting vessel and a support frame, having lower ends attached to the base frame and upper ends attached to the at least one closure element and suspending the at least one closure element above the opening in the base frame, the at least one closure element being supported during movement from a closed position in which the at least one closure element holds back the steel scrap by protruding at least partly into the vertical shaft, to an open position in which the at least one closure element is opened at least wide enough so that the steel scrap falls from the vertical shaft through the opening in the base frame and into the metallurgical melting vessel, the movement of the at least one closure element being along the arc of curvature and having an axis of rotation located at a vertical distance above the fingers and running transverse to a vertical axis of the vertical shaft, the axis of rotation being located at a center of the arc of curvature of the fingers.

11. The metallurgical melting apparatus as claimed in claim 10, wherein when the at least one closure element is in the closed position, a free end of the fingers projecting into the shaft is not higher above the metallurgical melting vessel than when the at least one closure element is in the open position.

12. The metallurgical melting apparatus as claimed in claim 11, wherein the at least one closure element performs a translational movement between the closed and the open position thereof.

13. The metallurgical melting apparatus as claimed in claim 12, wherein the at least one closure element includes two diametrically-opposed closure elements, each obstructing one half of the vertical shaft in the closed position.

14. The metallurgical melting apparatus as claimed in claim 13, wherein the two diametrically-opposed closure elements both pivot around the axis of rotation.

15. The metallurgical melting apparatus as claimed in claim 14, wherein the concave upper surface of the fingers form a trough-shaped recess in the closed position, having lowest points along a line substantially intersecting the vertical axis of the vertical shaft.

16. The metallurgical melting apparatus as claimed in claim 15, wherein the support structure includes at least one support bearing protruding, in the closed position of the at least one closure element, into the vertical shaft and supporting the at least one closure element on an underside thereof.

17. The metallurgical melting apparatus as claimed in claim 16, wherein the support structure further includes at least one support bracket supporting the at least one support bearing during movement translationally into and out of the vertical shaft.

* * * * *

UNITED STATES PATENT AND TRADEMARK OFFICE
CERTIFICATE OF CORRECTION

PATENT NO. : 9,945,002 B2  
APPLICATION NO. : 13/825768  
DATED : April 17, 2018  
INVENTOR(S) : Hannes Beile et al.

Page 1 of 1

It is certified that error appears in the above-identified patent and that said Letters Patent is hereby corrected as shown below:

On the Title Page

Item [54], and in the Specification, Column 1, Line 1, (Title), Delete "APPARTUS" and insert -- APPARATUS --, therefore.

Item [75] (Inventors), Line 11, Delete "Mëller," and insert -- Müller, --, therefore.

Signed and Sealed this  
Fifth Day of June, 2018

Andrei Iancu  
*Director of the United States Patent and Trademark Office*